US012351320B2

United States Patent
English

(10) Patent No.: US 12,351,320 B2
(45) Date of Patent: Jul. 8, 2025

(54) ELECTROTHERMAL HEATER

(71) Applicant: GKN Aerospace Services Limited, Redditch (GB)

(72) Inventor: Peter English, Redditch (GB)

(73) Assignee: GKN Aerospace Services Limited, Redditch (GB)

( * ) Notice: Subject to any disclaimer, the term of this patent is extended or adjusted under 35 U.S.C. 154(b) by 1084 days.

(21) Appl. No.: 16/603,641

(22) PCT Filed: Apr. 12, 2018

(86) PCT No.: PCT/EP2018/059469
§ 371 (c)(1),
(2) Date: Oct. 8, 2019

(87) PCT Pub. No.: WO2018/189341
PCT Pub. Date: Oct. 18, 2018

(65) Prior Publication Data
US 2021/0009274 A1    Jan. 14, 2021

(30) Foreign Application Priority Data
Apr. 13, 2017   (GB) .................................. 1705997.3

(51) Int. Cl.
*B64D 15/12*     (2006.01)
*H05B 1/02*     (2006.01)

(52) U.S. Cl.
CPC ........... *B64D 15/12* (2013.01); *H05B 1/0236* (2013.01); *H05B 2214/02* (2013.01)

(58) Field of Classification Search
CPC .. B64D 15/12; H05B 1/0236; H05B 2214/02; H05B 3/00
(Continued)

(56) References Cited

U.S. PATENT DOCUMENTS 5,361,183 A * 11/1994 Wiese ...................... H05B 3/36
                                                361/42
5,710,408 A    1/1998 Jones
(Continued)

FOREIGN PATENT DOCUMENTS

CN    102811907 A    12/2012
CN    102883954 A    1/2013
(Continued)

OTHER PUBLICATIONS

China National Intellectual Property Administration Notification of First Office Action with Search Report for related application No. CN201880024980.5 mailed Sep. 14, 2022 (10 pages; with English translation).
(Continued)

*Primary Examiner* — Tiffany T Tran
(74) *Attorney, Agent, or Firm* — Sheppard Mullin Richter & Hampton LLP

(57) ABSTRACT

An electrothermal heater for an ice protection system includes a laminated heater mat which comprises a primary heater element layer, a secondary heater element layer, and at least one dielectric layer interposed between the primary and secondary heater element layers, and control apparatus which comprises power supply apparatus and a current detector. The control apparatus is configured to have (i) a first mode in which the power supply apparatus supplies a heater current to the primary heater element layer and does not supply a heater current to the secondary heater element layer and the current detector monitors the secondary heater element layer for detecting a leakage current of the heater current of the primary heater element layer indicative of burn-out of the primary heater element layer and (ii) a second mode in which the power supply apparatus supplies a heater current to the secondary heater element layer and does not supply a heater current to the primary heater
(Continued)

element layer. The control apparatus is configured to switch from the first mode to the second mode in response to detection of said leakage current by the current detector.

14 Claims, 2 Drawing Sheets

(58) Field of Classification Search
USPC .................................. 219/548, 550, 528, 529
See application file for complete search history.

(56) References Cited

U.S. PATENT DOCUMENTS

| | | | | |
|---|---|---|---|---|
| 5,925,275 | A * | 7/1999 | Lawson | B64D 15/12 |
| | | | | 219/543 |
| 6,227,492 | B1 * | 5/2001 | Schellhase | B64D 15/14 |
| | | | | 244/134 D |
| 6,338,455 | B1 | 1/2002 | Rauch et al. | |
| 2007/0029307 | A1 * | 2/2007 | Erickson | H05B 3/145 |
| | | | | 219/543 |
| 2009/0206068 | A1 | 8/2009 | Ishizeki et al. | |
| 2010/0108661 | A1 * | 5/2010 | Vontell | H05B 3/34 |
| | | | | 219/205 |
| 2010/0243811 | A1 | 9/2010 | Stothers | |
| 2011/0049128 | A1 * | 3/2011 | Chow | G05D 23/24 |
| | | | | 219/494 |
| 2013/0001211 | A1 * | 1/2013 | Lewis | H05B 3/36 |
| | | | | 219/201 |
| 2013/0043342 | A1 | 2/2013 | Nordin | |
| 2013/0094148 | A1 * | 4/2013 | Sloane | H05K 1/0212 |
| | | | | 361/708 |
| 2013/0221975 | A1 * | 8/2013 | Ward | H02H 3/33 |
| | | | | 324/509 |
| 2014/0072429 | A1 | 3/2014 | Krainer | |
| 2016/0174357 | A1 * | 6/2016 | Paine | H01R 12/72 |
| | | | | 361/709 |
| 2016/0268933 | A1 * | 9/2016 | Kim | H02P 1/04 |
| 2016/0327006 | A1 * | 11/2016 | Khafagy | F02N 11/084 |
| 2016/0377487 | A1 * | 12/2016 | Cheung | G01K 1/20 |
| | | | | 29/611 |
| 2019/0212383 | A1 * | 7/2019 | Elliott | B64F 5/60 |

FOREIGN PATENT DOCUMENTS

| | | | | |
|---|---|---|---|---|
| DE | 102015107275 | A1 | 11/2016 | |
| EP | 1593595 | A2 | 11/2005 | |
| EP | 1757519 | A2 | 2/2007 | |
| EP | 2195238 | A2 * | 6/2010 | ............. B64D 15/14 |
| EP | 2679486 | A1 * | 1/2014 | ............... B64C 1/18 |
| GB | 833675 | A | 4/1960 | |
| GB | 2477338 | A | 8/2011 | |
| GB | 2477339 | A | 8/2011 | |
| JP | 2008171607 | A * | 7/2008 | |

OTHER PUBLICATIONS

International Search Report and Written Opinion for PCT/EP2018/059469 mailed Jun. 5, 2018 (14 pages).
UKIPO Search Report for GB1705997.3 mailed Oct. 9, 2017 (4 pages).
JPO Office Action for Patent Application No. JP2019-555946 mailed Jan. 5, 2021 (6 pages; with English translation).

* cited by examiner

ELECTROTHERMAL HEATER

CROSS-REFERENCE TO RELATED APPLICATIONS

This application is a national stage of, and claims priority to, Patent Cooperation Treaty Application No. PCT/EP2018/059469, filed on Apr. 12, 2018, which application claims priority to Great Britain Application No. GB 1705997.3, filed on Apr. 13, 2017, which applications are hereby incorporated herein by reference in their entireties.

BACKGROUND

For an aircraft, the in-flight formation of ice on the external surface of the aircraft is undesirable. The ice destroys the smooth flow of air over the aircraft surface, increases drag and decreases the ability of an aerofoil to perform its intended function.

Also, built-up ice may impede the movement of a movable control surface such as a wing slat or flap. Ice which has built up on an engine air inlet may be suddenly shed in large chunks which are ingested into the engine and cause damage.

It is therefore common for aircraft, and particularly commercial aircraft, to incorporate an ice protection system. A commercial aircraft may use a system which involves bleeding hot air off from the engines, and the hot air is then ducted to the airframe components such as the leading edges of the wing and the tail which are prone to ice formation. More recently, electrically powered systems have been proposed, such as in EP-A-1,757,519 which discloses a wing slat having a nose skin which incorporates an electrothermal heater blanket or mat. The heater mat is bonded to the rear surface of a metallic erosion shield which comprises the forwardly-facing external surface of the nose skin.

The heater mat is of the SPRAYMAT® type and is a laminated product comprising dielectric layers made of pre-impregnated glass fibre cloth and a heater element formed by flame spraying a metal layer onto one of the dielectric layers. The SPRAYMAT® has a long history from its original development in the 1950s by D. Napier & Sons Limited (see their GB-833,675 relating to electrical de-icing or anti-icing apparatus for an aircraft) through to its subsequent use by GKN Aerospace.

A SPRAYMAT produced in recent years by GKN Aerospace for use in a wing slat is formed on a male tool and involves laying up a stack of plies comprising (i) about 10 layers of glass fibre fabric preimpregnated with epoxy cured in an autoclave, (ii) a conductive metal layer (the heater element) which has been flame sprayed onto the laminate using a mask to form the heater element pattern and (iii) a final 3 or so layers of the glass fibre fabric. Wiring is soldered to the heater element to permit connection to the aircraft's power system. The heater mat is then cured in an autoclave.

A heater mat often incorporates a conductive ground plane as a safety device for detecting a fault with a heater element of the heater mat. The ground plane is connected to an aircraft earth as well as to a control unit.

A heater mat is generally very reliable. However, if the heater element in the heater mat does develop a fault in the form of heater burn-out, current will leak to the aircraft earth via the ground plane and the control unit can detect this change in current (by detecting an increase in the current supplied to the heater element—a so-called over-current) and take action to prevent thermal damage to the structure of the heater mat.

The erosion shield of the nose skin is also connected to the aircraft earth so that, during a lightning strike on the erosion shield, the resulting very large direct current of very short duration is dissipated to the aircraft earth by the erosion shield.

For many years, the ground plane was provided as a metallic mesh or a conductive fabric such as nickel-coated carbon tissue.

More recently, the ground plane has been provided as a flame sprayed metal layer, such as of copper or copper alloy, and the ground plane has been sprayed onto a dielectric ply layer which is made of thermoplastic material instead of the previously-used thermosetting (e.g. epoxy resin) material. This newer type of arrangement for the ground plane is described in GB-A-2,477,338 and GB-A-2,477,339.

In relation to detecting burn-out of the heater element layer of the heater mat, the ground plane functions to divert the leakage current from the damaged heater element layer to the aircraft earth, because the ground plane is electrically bonded to the earth provided by the frame of the aircraft.

It is important to detect the burn-out before the burn progresses into the structure of the heater mat and starts to damage its structural integrity.

As the burn-out starts to occur, the heater current supplied to the heater element layer will increase, and this increase can be detected by monitoring the power supply line leading to the heater element layer. When burn-out is detected, the heater element layer may be isolated and shut down.

However, due to tolerance spreads in heater current and detection capability, as well as in applying adequate noise rejection, the detection threshold is necessarily quite crude. Consequently, a burn due to a failure in a heater element of the heater element layer may progress significantly before detection and shutdown occur.

In some applications, it is critical that the ice protection system continues to provide a heating function even after the heater element layer has failed and been shutdown. Thus, the heater mat may be provided with a secondary (back-up or emergency) heater element layer for use if the (primary) heater element layer fails and is shut down.

However, the presence of a secondary heater element layer in addition to the primary heater element layer means that there is no room in the heater mat for a ground plane. This is because the presence of all of the metallic layers (primary heater element layer, secondary heater element layer, and ground plane) and their associated dielectric insulating plies would cause the thickness of the heater mat to build up to an unacceptable level.

It would be desirable to provide an improved electrothermal heater.

SUMMARY

The present disclosure relates generally to an electrothermal heater of an ice protection system suitable for use in an aircraft or other aerodynamic structure such as a blade of a wind turbine to prevent ice from forming and/or to remove ice that has already formed. These two functions may be termed anti-icing and de-icing, respectively.

According to a first aspect, there is provided an electrothermal heater for an ice protection system, the heater comprising:
  a laminated heater mat comprising a primary heater element layer, a secondary heater element layer, and at least one dielectric layer interposed between the primary and secondary heater element layers; and control apparatus comprising power supply apparatus and a current detector;

wherein the control apparatus is configured to have (i) a first mode in which the power supply apparatus supplies a heater current to the primary heater element layer and does not supply a heater current to the secondary heater element layer and the current detector monitors the secondary heater element layer for detecting a leakage current of the heater current of the primary heater element layer indicative of burn-out of the primary heater element layer and (ii) a second mode in which the power supply apparatus supplies a heater current to the secondary heater element layer and does not supply a heater current to the primary heater element layer; and wherein the control apparatus is configured to switch from the first mode to the second mode in response to detection of said leakage current by the current detector.

In effect, the secondary heater element layer functions as a temporary ground plane in the first mode and as a heater in the second mode. There is no longer any need for the heater mat to include a dedicated, permanent ground plane (in addition to the secondary heater element layer) which would undesirably increase the thickness of the heater mat.

It was previously not considered possible to incorporate a fault-detection layer in a heater mat of a dual-redundant ice protection system because of space constraints.

The first mode corresponds to a normal mode of operation of the heater, and the second mode corresponds to an emergency (backup) mode of operation of the heater as it is used when there has been a burn-out failure of the primary heater element layer in the first mode.

In presently examples, the current detector comprises a Hall-effect current sensor and/or a current transformer.

For an AC heater system, a current transformer is a simple solution since any current in the temporary ground plane (the secondary heater element layer) must be fault current and thus can easily be detected. Current transformers have virtually zero effect on the series resistance of a bonding wire connecting the secondary heater element layer to an aircraft earth (aircraft ground).

A current transformer may be used to detect either an increase in current in the secondary heater element layer (above a pre-determined noise threshold) and/or to detect a high frequency AC current caused by arcing in a burn process occurring in the primary heater element layer.

For a DC heater system, the current transformer solution is not possible, other than as an arcing-detection mechanism, but a Hall-effect current sensor may have similar near-zero effect on electrical bonding between the secondary heater element layer and an aircraft earth as is the case with a current transformer. As with a current transformer, a Hall-effect sensor may be used to detect either an increase in current in the secondary heater element layer (above a pre-determined noise threshold) and/or to detect a high frequency AC current caused by arcing in the primary heater element layer.

Monitoring for a ground plane current whilst maintaining ground-bond integrity was not previously considered feasible. This has been because the ground plane is necessarily electrically bonded to the airframe ground (earth), and thus current detection in the ground plane has not been previously considered. However, by monitoring current in the ground-bonding connection (by use of a current transformer, a Hall-effect sensor or similar indirect detection technology), fault detection in a ground plane is now possible, whilst maintaining electrical bond integrity of the ground plane via the ground-bonding connection (such as a wire or strap).

In some embodiments, the secondary heater element layer comprises a plurality of heater elements. The control apparatus may be arranged, in the first mode, to connect the heater elements together electrically and, when switching from the first mode to the second mode, to re-configure the heater elements as electrically separate heater elements.

The heating elements in the secondary (emergency) layer, which are only ever used for heating in case of primary system failure, may be connected together and bonded to system ground when not in active use. Configured thus, the secondary layer becomes a fault-detecting ground plane, and current monitoring in a ground wire (bonding wire or line connectable to aircraft ground or earth) may be used for fault detection. If a fault is detected, the primary layer may be isolated and the secondary layer may be reconfigured to its intended emergency ice-protection role.

In some embodiments, the control apparatus includes a switch device which, in the first mode, connects the secondary heater element layer to an earth line and, in the second mode, connects the secondary heater element layer to a power supply line of the power supply apparatus.

In some embodiments, the control apparatus comprises a control unit; and the switch device comprises a switch and a relay which is configured to be responsive to a command signal of the control unit produced in response to detection of said leakage current by the current detector so as to switch the switch from being in the first mode to being in the second mode.

In some embodiments, the current detector comprises a sensor positioned to detect leakage current in an earth line which runs from the secondary heater element layer and is connectable to an earth, such as an airframe earth of an aircraft. For example, the sensor comprises a sensor element (e.g., a sensor coil) positioned around or adjacent to the earth line but not positioned in the earth line.

In some embodiments, the power supply apparatus has a first power supply line for supplying power to the primary heater element layer and a second power supply line for supplying power to the secondary heater element layer.

In some embodiments, a control unit of the control apparatus is configured in the first mode to connect the first power supply line and to disconnect the second power supply line and in the second mode to disconnect the first power supply line and to connect the second power supply line.

In some embodiments, the heater mat does not include a ground plane in addition to the secondary heater element layer.

In some embodiments, the heater mat comprises a laminated stack comprising a first group of dielectric layers, the secondary heater element layer, a second group of dielectric layers, the primary heater element layer, and a third group of dielectric layers. The first group of dielectric layers may provide the base (or rear surface) of the heater mat, and the third group of dielectric layers may provide the top (or front surface) of the heater mat.

For ease of manufacture, the dielectric layers may all be made of the same material.

The primary and/or secondary heater element layers may be porous. Porosity encourages migration of adjacent dielectric material through the heater element layers, which improves the structural integrity of the heater mat and makes it less likely that de-lamination will occur at the heater element layers. Flame spraying may be used to lay down heater element layers which are porous.

An aircraft component may comprise an aerodynamic external panel and an electrothermal heater in accordance with the present invention, wherein the electrothermal heater mat of the electrothermal heater is bonded to a surface (e.g., a rear surface) of the external panel. For example, the external panel may be an erosion shield.

The aircraft component may be incorporated in an aircraft which includes an aircraft earth such as an airframe earth. The control apparatus may be configured so that, in the first mode, the secondary heater element layer is connected to the aircraft earth and, in the second mode, the secondary heater element layer is not connected to the aircraft earth.

According to a second aspect, there is provided a method of operating an electrothermal heater in an aircraft which has an aircraft earth, the electrothermal heater comprising a laminated heater mat having a primary heater element layer, a secondary heater element layer, and at least one dielectric layer interposed between the primary and secondary heater element layers, the method comprising the steps of:

supplying a heater current to the primary heater element layer whilst not supplying a heater current to the secondary heater element layer and with the secondary heater element layer connected to the aircraft earth;

monitoring a current path from the secondary heater element layer to the aircraft earth for a leakage current which originates from the primary heater element layer and is indicative of burn-out of the primary heater element layer; and in response to detection of said leakage current, ceasing to supply the heater current to the primary heater element layer, disconnecting the secondary heater element layer from the aircraft earth and starting to supply a heater current to the secondary heater element layer.

In some embodiments, the secondary heater element layer comprises a plurality of heater elements. In the monitoring step, the heater elements may be connected together electrically and all of the heater elements are connected via the current path to the aircraft earth. In response to detection of said leakage current, the heater elements may be re-configured as electrically separate heater elements and the heater current supplied to the secondary heater element layer is split between the separate heater elements.

In some embodiments, in the monitoring step, a switch connects the secondary heater element layer to the aircraft earth via the current path. In response to the detection of said leakage current, the switch may be operated to disconnect the secondary heater element layer from the aircraft earth. In some embodiments, the operation of the switch may also connect the secondary heater element layer to a power supply line.

In some embodiments, in response to the detection of said leakage current, a notification may be provided in a cockpit of the aircraft that the heater mat has a suspected burn-out and that the heater mat is now operating in a back-up mode.

In some embodiments, the heater mat is not provided with a ground plane in addition to the secondary heater element layer, which functions as a temporary ground plane whilst it is connected to the aircraft earth.

BRIEF DESCRIPTION OF THE DRAWINGS

Some embodiments will now be described, by way of example only, with reference to the accompanying drawings in which:—

Figure 1:
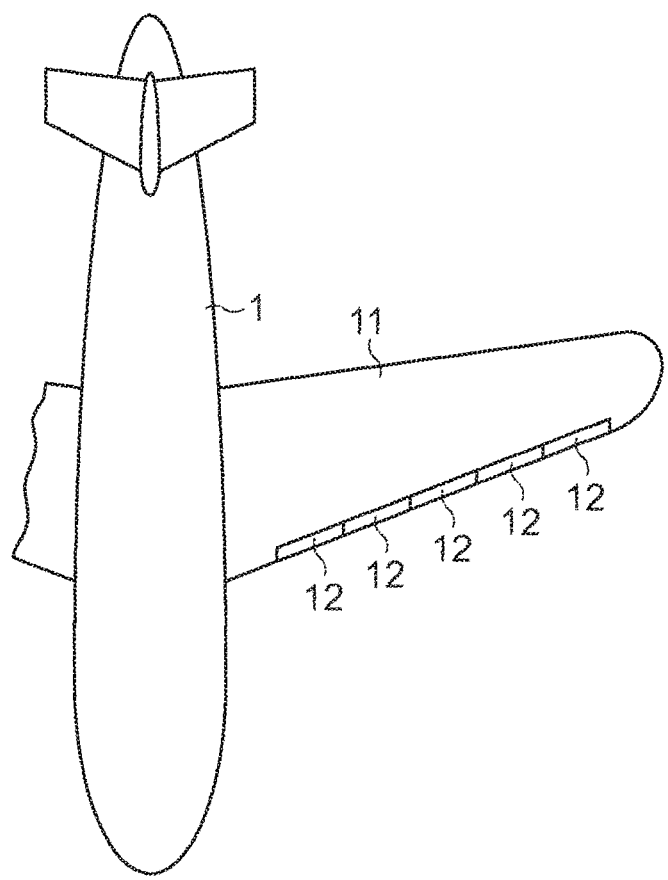
FIG. 1 is a diagrammatic plan view of an aircraft having slats in the leading edge of a wing.

While the invention is susceptible to various modifications and alternative forms, some embodiments are shown by way of example in the drawings and are herein described in detail. It should be understood, however, that the drawings and detailed description of these embodiments are not intended to limit the invention to the particular forms disclosed. On the contrary, the invention covers all modifications, equivalents and alternatives falling within the spirit and the scope of the present invention as defined by the appended claims.

DESCRIPTION

FIG. 1 is a plan view of an aircraft 1 having a wing 11 along the leading (forward) edge of which are positioned five wing slats 12. Each wing slat 12 incorporates an electrothermal ice protection system.

Figure 2:
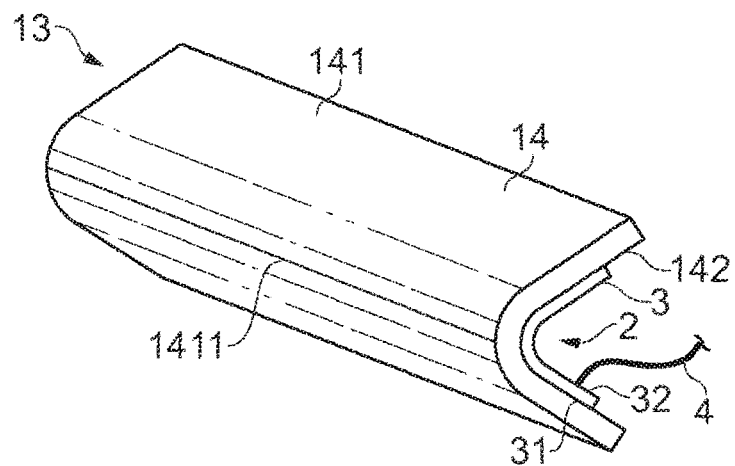
FIG. 2 is a diagrammatic perspective view of a nose skin of a wing slat of FIG. 1.

FIG. 2 is a diagrammatic perspective view of a demountable nose skin 13 of one of the wing slats 12 of FIG. 1. The configuration of the nose skin 13 may be generally the same as in EP-A-1,757,519 (GKN Aerospace) which discloses a wing slat having a demountable forward section comprising a nose skin.

The nose skin 13 comprises an erosion shield 14 and an electrically-powered heater 2.

The heater 2 comprises a heater blanket or mat 3 and a bundle of wires or lines 4 which connect the heater mat 3 to associated power supply and control electronics.

The erosion shield 14 is generally rectangular and has a front surface 141 which is convexly curved and a rear surface 142 which is concavely curved. An apex 1411 of the front surface 141 provides the leading edge of the aircraft wing 11.

The heater mat 3 is generally rectangular and has a front surface 31 which is convexly curved and a rear surface 32 which is concavely curved. The convex front surface 31 conforms to the shape of and is bonded to the rear surface 142 of the erosion shield 14. In this way, thermal energy generated as the heater mat 3 is operated passes, by conduction, into the erosion shield 14 in order to provide an ice protection function. The erosion shield 14 is metallic and may be made of aluminium (which is the usual material) or titanium (which is expensive but may offer some functional and processing benefits). An important function of the erosion shield 14 is to protect the aircraft against lightning strikes by absorbing and dissipating the lightning current.

The concave rear surface 32 of the heater mat 3 may be attached to a support structure of the wing slat 12.

Figure 3:
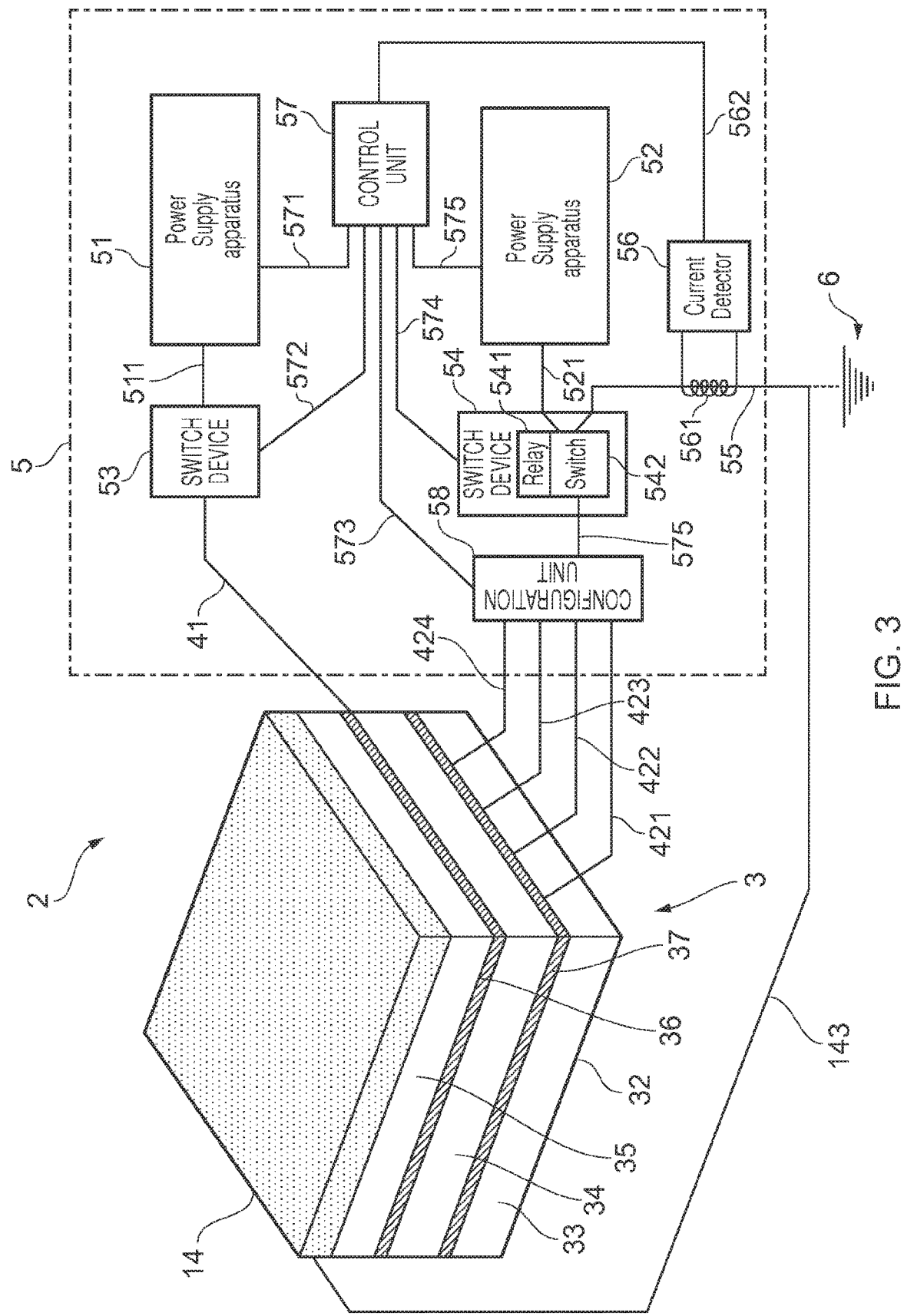
FIG. 3 is a diagrammatic representation of an embodiment of an electrothermal heater for an exemplary ice protection system.

FIG. 3 is a diagrammatic representation of an embodiment of an electrothermal heater 2 for an exemplary ice protection system.

In FIG. 3, the heater mat 3 of the heater 2 is diagrammatically shown as being planar and not curved, for ease of depiction. The heater mat 3 comprises a first group 33 of dielectric layers which provide structure to the heater mat and which may be made of GRP (glass reinforced plastic) or CFRP (carbon fiber reinforced plastic). We envisage that the dielectric layers may be the older-style thermosetting type (containing epoxy resin) or the newer-style thermoplastic type. Examples of suitable high-temperature engineering thermoplastic include PEEK (polyether ether ketone), PEKK (polyetherketoneketone), PPS (polyphenylene sulphide), PEI (polyetherimide) and PES (polyethersulphone), and mixtures thereof. These materials are able to withstand flame spraying without significant damage. PEEK and PEKK are particularly preferred because PEEK has the necessary mechanical performance and is particularly receptive to a flame-sprayed metal coating, and PEKK has similar properties but is easier to bond to the metal material.

The heater mat 3 also comprises a second group 34 and a third group 35 of dielectric layers which are similar to the first group 33 of dielectric layers.

A flame-sprayed primary heater element layer 36 is positioned between the second and third groups 34, 35 of dielectric layers. A flame-sprayed secondary heater element layer 37 is positioned between the first and second groups 33, 34 of dielectric layers. Each heater element layer 36, 37 may be made of copper or copper alloy.

The top face of the third group 35 of dielectric layers is bonded to the rear face of the aluminium erosion shield 14.

The heater 2 further comprises control apparatus 5, which includes first and second power supply apparatus units 51, 52. The first power supply apparatus unit 51 is arranged to supply a heater current to the primary heater element layer 36 through a switch device 53 along a power supply line 41, 511 when the control apparatus 5 is in a first mode. In a second mode of the control apparatus 5, the switch device 53 cuts off the heater current to the primary heater element layer 36.

The second power supply apparatus unit 52 is arranged, in the second mode of the control apparatus 5, to supply a heater current to the secondary heater element layer 37 through a switch device 54.

The switch device 54 includes a relay 541 and a switch 542. In the first mode of the control apparatus 5, the switch 542 connects the secondary heater element layer 37 to an aircraft earth 6 via an earth line 55.

The erosion shield 14 is also connected to the aircraft earth 6, via an earth line 143.

The control apparatus 5 includes a current detector 56 which has a sensor coil 561 positioned around the earth line 55 for detecting current in the earth line 55. The output of the current detector 56 is fed via a line 562 to a control unit 57.

The control unit 57 is able to send a command signal via a line 571 to switch on or off the first power supply apparatus unit 51, and to send a command signal via a line 572 to open and close the switch device 53.

The control unit 57 is also connected via a line 573 to control a configuration unit 58 which controls the electrical configuration (series or parallel) of individual heater elements (not shown) which make up the secondary heater element layer 37.

Furthermore, the control unit 57 is connected via a line 574 to the switch device 54 to control the relay 541, and via a line 575 to the second power supply apparatus unit 52 to switch it on and off.

The secondary heater element layer 37 is shown as having four heater elements, but the number of heater elements may be varied. Each of lines 421, 422, 423, 424 runs from the configuration unit 58 to a respective one of the heater elements of the secondary heater element layer 37. In the first mode of the control apparatus 5, a command signal from the control unit 57 along the line 573 causes the configuration unit 58 to configure the heater elements to be in series to function as one as a temporary ground plane.

In the second mode of the control apparatus 5, a command signal from the control unit 57 along the line 573 causes the configuration unit 58 to re-configure the heater elements to be in parallel so that power can be individually supplied to the heater elements of the secondary heater element layer 37 to enable it to function as an emergency or back-up heater element layer.

A power supply line 521 connects the second power supply apparatus unit 52 to the switch device 54.

When the switch 542 is operated by the relay 541, it switches between connecting a line 575 (between the configuration unit 58 and the switch device 54) to the earth line 55 (in the first mode) and to the power supply line 521 (in the second mode).

In the first mode of the control apparatus 5, when the primary heater element layer 36 experiences a fault in the form of burn-out, some of the heater current supplied to the primary heater element layer 36 along the power supply line 41, 511 leaks through the dielectric layers 34 to the secondary heater element layer 37. In the first mode, the secondary heater element layer 37 is configured to act as a temporary ground plane.

The leakage current that reaches the secondary heater element layer 37 passes along the lines 421-424, through the configuration unit 58, along the line 575, through the switch 542 and along the earth line 55 to the aircraft earth 6.

As the leakage current passes along the earth line 55, it is sensed by the sensor coil 561 of the current detector 56 which is of the Hall-effect current sensor type or a current transformer type. The output of the current detector 56 is fed to the control unit 57 along line 562. When the control unit 57 determines that the leakage current has increased above a threshold value that indicates that burn-out of the primary heater element layer 36 is occurring, the control unit 57 switches the control apparatus 5 from its first mode to its second mode by issuing command signals along the lines 571-575.

In switching to the second mode, the control unit 57 instructs the first power supply apparatus unit 51 to close down so as to stop supplying a heater current to the primary heater element layer 36, and instructs the switch device 53 to close.

As a further part of switching to the second mode, the control unit 57 instructs the configuration unit to re-configure the secondary heater element layer 37 from being a ground plane back to being individual heater elements. The switch device 54 is instructed to operate the relay 541 to cause the switch 542 to disconnect the line 575 from the earth line 55, and instead to connect the line 575 to the power supply line 521 so that the second power supply apparatus unit 52 may start to supply a heater current to the secondary heater element layer 37 via the switch device 54, the configuration unit 58 and the lines 421-424.

The heater mat 3 can therefore provide a back-up (emergency) heating function by virtue of using the secondary heater element layer 37 when the primary heater element layer 36 experiences a burn-out fault and is no longer able to operate safely without damaging the structure of the heater mat 3. The back-up (emergency) heating function is provided as a second (emergency) mode of operation. In the normal (first) mode of operation when the primary heater element layer 36 is undamaged and is operating normally, the secondary heater element layer 37 is able to operate as a temporary ground plane ready to detect leakage current from the primary heater element layer 36 that might indicate the occurrence of a burn-out fault. For the vast majority of the time, the operation is likely to be in the first mode, and thus for the vast majority of the time the heater mat 3 will have the reassuring provision of a ground plane in the form of the temporary ground plane provided by the secondary heater element layer 37. The second mode is likely to be operated in for only a short time, until it is possible to repair or replace the faulty heater mat 3. The absence of a ground plane in the second mode is therefore likely to be deemed acceptable for the short period of time involved. The chance of the secondary heater element layer 37 itself developing a burn-out fault in this short period of time is likely to be acceptably small. Thus, the heater mat 3 can be deemed acceptable even though it does not have a permanent, dedicated ground plane to supplement the heater element layers 36, 37.

The heater mat of an electrothermal heater may be incorporated in any (e.g., forwardly-facing) surface of an aircraft that may be prone to ice formation in flight. For example, alternatives to incorporating the heater mat in the leading edge of a wing include incorporating it in the leading edge of a fin or tailplane, or at the air intake of an engine, or in a trailing-edge flap to stop ice formation on the flap when it is deployed, or in an aileron, or in a rotating blade such as a propeller blade.

The invention claimed is:

1. An electrothermal heater for an ice protection system, the heater comprising:
 a laminated heater mat comprising a primary heater element layer, a secondary heater element layer, and at least one dielectric layer interposed between the primary and secondary heater element layers; and
 a control apparatus comprising a power supply apparatus and a current detector;
 wherein the control apparatus is configured to have (i) a first mode in which the power supply apparatus supplies a heater current to the primary heater element layer and does not supply a heater current to the secondary heater element layer, and the current detector monitors the secondary heater element layer for detecting a leakage current of the heater current of the primary heater element layer indicative of burn-out of the primary heater element layer, and (ii) a second mode in which the power supply apparatus supplies a heater current to the secondary heater element layer and does not supply a heater current to the primary heater element layer;
 wherein the control apparatus is configured to switch from the first mode to the second mode in response to detection of said leakage current by the current detector; and
 wherein the secondary heater element layer functions as a temporary ground plane in the first mode and as a heater in the second mode.

2. The electrothermal heater of claim 1, wherein:
 the secondary heater element layer comprises a plurality of heater elements; and
 the control apparatus is arranged, in the first mode, to connect the heater elements together electrically and, when switching from the first mode to the second mode, to re-configure the heater elements as electrically separate heater elements.

3. The electrothermal heater of claim 1, wherein the control apparatus includes a switch device which, in the first mode, connects the secondary heater element layer to an earth line and, in the second mode, connects the secondary heater element layer to a power supply line of the power supply apparatus.

4. The electrothermal heater of claim 3, wherein the current detector comprises a sensor positioned to detect leakage current in the earth line.

5. The electrothermal heater of claim 1, wherein the current detector comprises a Hall-effect current sensor or a current transformer.

6. The electrothermal heater of claim 1, wherein the power supply apparatus has a first power supply line for supplying power to the primary heater element layer and a second power supply line for supplying power to the secondary heater element layer.

7. The electrothermal heater of claim 6, wherein a control unit of the control apparatus is configured in the first mode to connect the first power supply line and to disconnect the second power supply line, and in the second mode to disconnect the first power supply line and to connect the second power supply line.

8. The electrothermal heater of claim 1, wherein the heater mat does not include a ground plane in addition to the secondary heater element layer.

9. The apparatus of claim 1, wherein the secondary heater element layer, when functioning as a temporary ground plane in the first mode, diverts a leakage current from the primary heater element when the primary heater element layer experiences burn-out.

10. An electrothermal heater for an ice protection system, the heater comprising:
 a laminated heater mat comprising a primary heater element layer, a secondary heater element layer, and at least one dielectric layer interposed between the primary and secondary heater element layers; and
 a control apparatus comprising a power supply apparatus and a current detector;
 wherein:
 the control apparatus is configured to have (i) a first mode in which the power supply apparatus supplies a heater current to the primary heater element layer and does not supply a heater current to the secondary heater element layer, and the current detector monitors the secondary heater element layer for detecting a leakage current of the heater current of the primary heater element layer indicative of burn-out of the primary heater element layer, and (ii) a second mode in which the power supply apparatus supplies a heater current to the secondary heater element layer and does not supply a heater current to the primary heater element layer;
 the control apparatus is configured to switch from the first mode to the second mode in response to detection of said leakage current by the current detector;
 the control apparatus includes a switch device which, in the first mode, connects the secondary heater element layer to an earth line and, in the second mode, connects the secondary heater element layer to a power supply line of the power supply apparatus;
 the control apparatus comprises a control unit; and
 the switch device comprises a switch and a relay which is configured to be responsive to a command signal of the control unit produced in response to detection of said leakage current by the current detector so as to switch the switch from being in the first mode to being in the second mode.

11. The apparatus of claim 10, wherein the switch of the switch device connects the secondary heater element layer to an earth line in the first mode and connects the secondary heater element layer to a power supply line of the power supply apparatus in the second mode.

12. An apparatus, comprising:
 an aircraft component comprising an aerodynamic external panel and an electrothermal heater, the heater including:

a laminated heater mat comprising a primary heater element layer, a secondary heater element layer, and at least one dielectric layer interposed between the primary and secondary heater element layers; and a control apparatus comprising a power supply apparatus and a current detector;

wherein the control apparatus is configured to have (i) a first mode in which the power supply apparatus supplies a heater current to the primary heater element layer and does not supply a heater current to the secondary heater element layer, and the current detector monitors the secondary heater element layer for detecting a leakage current of the heater current of the primary heater element layer indicative of burn-out of the primary heater element layer, and (ii) a second mode in which the power supply apparatus supplies a heater current to the secondary heater element layer and does not supply a heater current to the primary heater element layer;

wherein the control apparatus is configured to switch from the first mode to the second mode in response to detection of said leakage current by the current detector;

wherein the secondary heater element layer functions as a temporary ground plane in the first mode and as a heater in the second mode; and wherein the electrothermal heater mat of the electrothermal heater is bonded to a surface of the external panel.

13. The apparatus of claim 12, wherein the external panel is an erosion shield.

14. The apparatus of claim 12, further comprising an aircraft that includes the aircraft component, wherein the aircraft includes an aircraft earth, and the control apparatus is configured so that, in the first mode, the secondary heater element layer is connected to the aircraft earth and, in the second mode, the secondary heater element layer is not connected to the aircraft earth.

* * * * *